US011941074B2

(12) United States Patent
Breedvelt-Schouten et al.

(10) Patent No.: US 11,941,074 B2
(45) Date of Patent: Mar. 26, 2024

(54) FETCHING A QUERY RESULT USING A QUERY FILTER

(71) Applicant: INTERNATIONAL BUSINESS MACHINES CORPORATION, Armonk, NY (US)

(72) Inventors: Ilse M. Breedvelt-Schouten, Manotick (CA); Michael McGeein, Orleans (CA)

(73) Assignee: International Business Machines Corporation, Armonk, NY (US)

( * ) Notice: Subject to any disclaimer, the term of this patent is extended or adjusted under 35 U.S.C. 154(b) by 91 days.

(21) Appl. No.: 17/655,471

(22) Filed: Mar. 18, 2022

(65) Prior Publication Data

US 2023/0297632 A1 Sep. 21, 2023

(51) Int. Cl.
*G06F 16/953* (2019.01)
*G06F 16/2458* (2019.01)

(52) U.S. Cl.
CPC ........ *G06F 16/953* (2019.01); *G06F 16/2477* (2019.01)

(58) Field of Classification Search
CPC ............................ G06F 16/2477; G06F 16/953
See application file for complete search history.

(56) References Cited

U.S. PATENT DOCUMENTS

| | | | |
|---|---|---|---|
| 9,348,867 B2 | 5/2016 | Chan | |
| 10,216,631 B1* | 2/2019 | McConnell | ......... G06F 12/0808 |
| 10,346,418 B2* | 7/2019 | Dentzer | .................. G06F 16/21 |
| 10,565,203 B1* | 2/2020 | Lashmet | ............... G06F 16/248 |
| 2004/0117359 A1* | 6/2004 | Snodgrass | ........... G06F 16/2477 |
| 2004/0215626 A1 | 10/2004 | Colossi | |
| 2005/0055385 A1 | 3/2005 | Sinha | |
| 2006/0004707 A1* | 1/2006 | Dettinger | ............ G06F 16/2425 |
| 2013/0091151 A1* | 4/2013 | Palmert | ............... G06F 16/2282 |
| | | | 707/750 |

OTHER PUBLICATIONS

Cheng et al., How Fresh Do You Want Your Search Results?, CIKM'13, Oct. 27-Nov. 1, 2013, San Francisco, CA, USA., pp. 1271-1280. (Year: 2013).*
Anonymous. "Creating data sets." Accessed Feb. 22, 2022. 3 pages. Published by IBM. https://www.ibm.com/docs/en/cognos-analytics/11.0.0?topic=data-creating-sets.
Anonymous. "Data Model Optimizations For Better Performances." Printed May 3, 2021. 14 pages. Published by ClicData. https://www.clicdata.com/blog/data-model-optimizations-for-better-performances/.
Wilson, Mike, "Store Result Sets with Materialized Views in PostgreSQL." Published Jan. 4, 2017 by Compose. 9 pages. https://www.compose.com/articles/store-result-sets-with-materialized-views-in-postgresql/.

* cited by examiner

*Primary Examiner* — Cheyne D Ly
(74) *Attorney, Agent, or Firm* — Matthew Zehrer

(57) ABSTRACT

A query scheme is presented in which a query filter data structure is created and utilized to determine whether to obtain live query data from a storage server or aged data within an associated dataset. The number of queries to the storage server may be reduced and overall efficiency of the query system is increased. Another query scheme is presented to adjust the frequency of a dataset refresh based upon a user defined data age parameter indication that is contained a subsequent query and/or based upon whether a frequency of storage server queries is above a predetermined threshold. The propensity of obtaining query results from a dataset is increased while the propensity of queries to the storage server decreases, thereby increasing query system efficiency.

20 Claims, 6 Drawing Sheets

FETCHING A QUERY RESULT USING A QUERY FILTER

BACKGROUND

Various embodiments of the present application generally relate to querying stored data. More specifically, various embodiments may relate to creating a query filter data structure and utilizing the query filter data structure to determine whether to fetch live query result data from a storage server or aged query result data from an associated dataset. Additionally, various embodiments may relate to adjusting a refresh frequency of related datasets based upon a data age indication contained a subsequent user query request and/or based upon a frequency of storage server queries.

SUMMARY

In an embodiment of the present invention, a query system is presented. The query system includes a query server that includes a processor and a memory. The memory includes a query module, that when called by the processor, causes the query server to receive, from a query manager computing entity, a plurality of query filter data structures each including a different assigned query subject and a subject data age period. The query module, when called by the processor, further causes the query server to receive, from a query user computing entity, a query comprising a request for a query result and a user defined data age parameter. The query module, when called by the processor, further causes the query server to parse the query to determine a query subject and identify one query filter data structure that includes a same assigned query subject to the query subject. The query module, when called by the processor, further causes the query server to determine whether the user defined data age parameter is entirely bounded within the subject data age period of the one query filter data structure. The query module, when called by the processor, further causes the query server to fetch query result data from a dataset associated with the one query filter data structure, if the user defined data age parameter is entirely bounded within the subject data age period of the one query filter data structure. The query module, when called by the processor, further causes the query server to fetch query result data from a storage server communicatively connected to the query by a network, if the user defined data age parameter is not entirely bounded within the subject data age period of the one query filter data structure.

In another embodiment of the present invention, a computer program product to fetch query result data is presented. The computer program product includes a computer readable storage medium having program instructions embodied therewith. The program instructions are readable to cause a processor to receive, from a query manager computing entity, a plurality of query filter data structures each comprising a different assigned query subject and a subject data age period. The program instructions are readable to further cause the processor to receive, from a query user computing entity, a query comprising a request for a query result and a user defined data age parameter. The program instructions are further readable to cause the processor to parse the query to determine a query subject and identify one query filter data structure comprising a same assigned query subject to the query subject. The program instructions are further readable to cause the processor to determine whether the user defined data age parameter is entirely bounded within the subject data age period of the one query filter data structure. The program instructions are further readable to cause the processor to fetch query result data from a dataset associated with the one query filter data structure, if the user defined data age parameter is entirely bounded within the subject data age period of the one query filter data structure. The program instructions are further readable to cause the processor to fetch query result data from a storage server communicatively connected to the query by a network, if the user defined data age parameter is not entirely bounded within the subject data age period of the one query filter data structure.

In yet another embodiment of the present invention, a method to fetch query result data is presented. The method includes receiving, from a query manager computing entity, a plurality of query filter data structures each comprising a different assigned query subject and a subject data age period. The method further includes receiving, from a query user computing entity, a query comprising a request for a query result and a user defined data age parameter. The method further includes parsing the query to determine a query subject. The method further includes identifying one query filter data structure comprising a same assigned query subject to the query subject. The method further includes determining whether the user defined data age parameter is entirely bounded within the subject data age period of the one query filter data structure. The method further includes fetching query result data from a dataset associated with the one query filter data structure, if the user defined data age parameter is entirely bounded within the subject data age period of the one query filter data structure. The method further includes fetching query result data from a storage server communicatively connected to the query by a network, if the user defined data age parameter is not entirely bounded within the subject data age period of the one query filter data structure.

These and other embodiments, features, aspects, and advantages will become better understood with reference to the following description, appended claims, and accompanying drawings.

Figure 1:
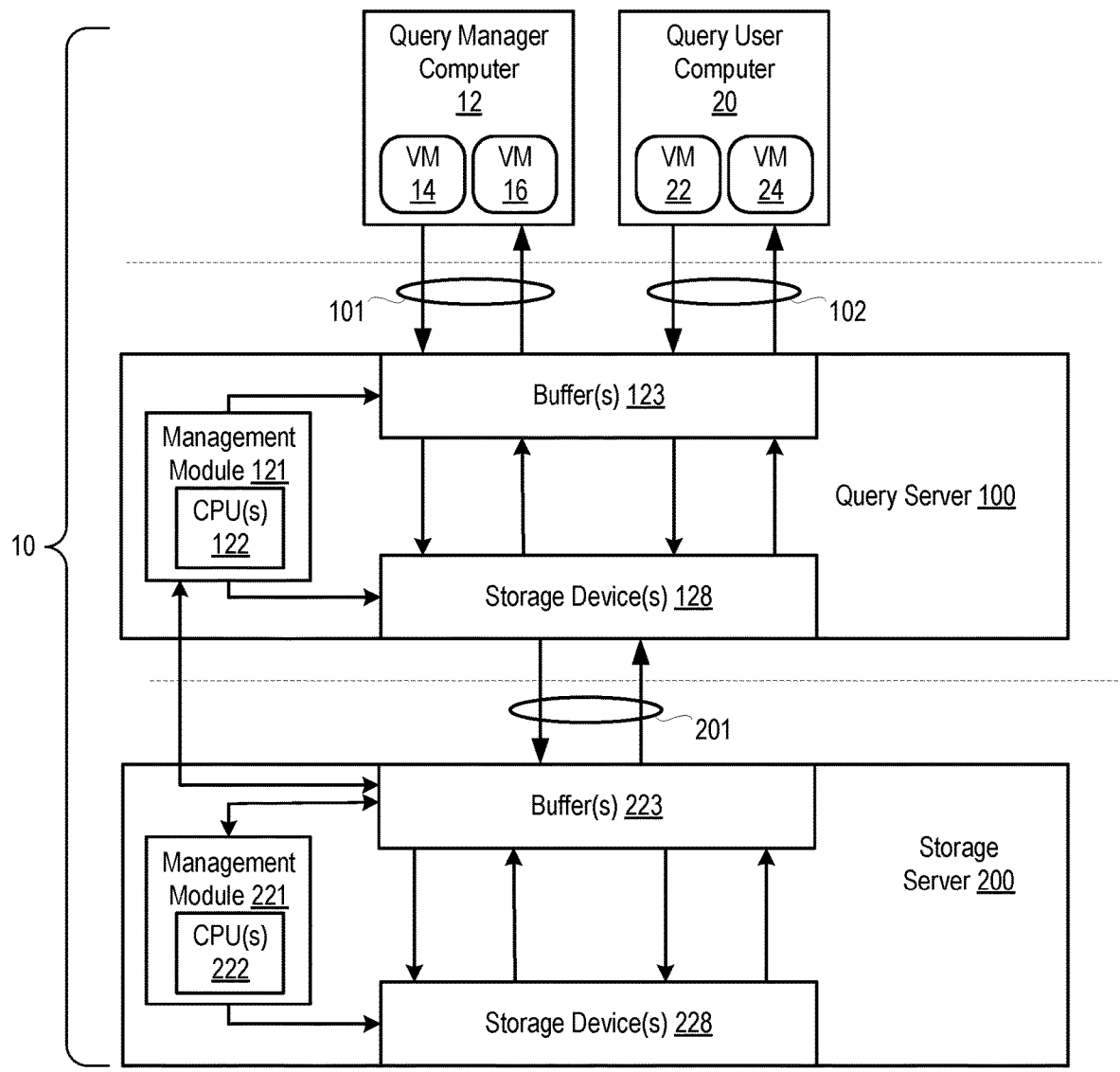
FIG. 1 is a block diagram illustrating an implementation of a data query system, in accordance with some embodiments.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and Figures.

DETAILED DESCRIPTION

Data driven decision making is becoming increasingly important. Typically, data used for decision making processes resides on storage server(s), which are accessed when a user performs a query. The more users that perform queries to the storage server(s), the more likely that storage server(s) may become overburdened and operational efficiency may decrease. Further, query users increasingly expect data to return from the storage server as quickly as possible. Therefore, when storage system performance decreases, data retrieval therefrom and user experience associated therewith is adversely affected.

Storage server efficiency may be increased with query data models that enable the sharing of query data amongst multiple users. More specifically, performance may be improved by performing queries and obtaining a query result in advance. Subsequently, when users make a query, the query result is available to return to those users without spending the requisite resources of accessing the storage system. Such all-or-nothing approach has several limitations: it is difficult to predict when or how often a storage server will need to be accessed in advance, it is difficult to predict when or how often the query result needs to be refreshed, etc.

Another problem with such an approach is the difficulty of providing specific query results to users with different data age requirements. For example, some users request query results that contain live query data, while others request queries in which older data is adequate.

To address these problems, a query scheme is presented in which a query filter data structure is created and utilized to determine whether to obtain live query data from a storage server or aged data within a previously created dataset. In utilizing this scheme, the number of queries to the storage server is reduced and overall efficiency of the query system is increased. Additionally, a query scheme is presented to adjust the frequency of a previously created dataset refresh based upon a data age indication that is contained in a subsequent user query request and/or based upon a frequency of storage server queries. In utilizing this scheme, the propensity of a dataset to be existing and containing adequate data to satisfy user queries is increased, which also ultimately reduces a number of queries to the storage server and increases query system efficiency.

Numerous details are described herein in order to provide a thorough understanding of the example embodiments illustrated in the accompanying drawings. However, some embodiments may be practiced without many of the specific details, and the scope of the claims is only limited by those features and aspects specifically recited in the claims. Furthermore, well-known methods, components, circuits, or the like, have not been described in exhaustive detail so as not to unnecessarily obscure more pertinent aspects of the embodiments described herein.

FIG. 1 is a diagram of an implementation of a query system 10, in accordance with some embodiments. While some example features are illustrated, various other features have not been illustrated for the sake of brevity and so as not to obscure more pertinent aspects of the example embodiments disclosed herein.

To that end, as a non-limiting example, query system 10 includes a query manager computer 12, a query user computer 20, a query server 100 that is used in conjunction with query manager computer 12 and query user computer 20, and storage server 200 that is used in conjunction with query server 100.

Query manager computer 12 and query user computer 20 may be collectively referred to as physical computer systems 12, 20, respectively. The physical computer systems 12, 20 are examples of distinct or discrete computing entities. The term computing entity is defined herein to be a physical computer or virtual machine (VM). In some embodiments, each computing entity is communicatively connected to query server 100 by a known network.

The physical computer systems 12, 20 may be a server, a computer, a laptop computer, a tablet device, a netbook, an internet kiosk, a personal digital assistant, a mobile phone, a smart phone, a gaming device, or other physical computing device. Similarly, the computing entities may be a distinct VM 14, 16, 22, 24. Each VM 14, 16, 22, 24 is a virtual computer with its own virtual computing resources created on physical computer system 12, 20. Typically, software separates the physical computer system 12, 20 resources and provisions them appropriately so they can be used by each VM 14, 16, 22, 24, respectively. In the depicted example, VM 14 and VM 16 function as discrete virtual computers with their own virtual computing resources created on physical computer system 12, 20. Similarly, VM 22 and VM 24 function as discrete virtual computers with their own virtual computing resources created on physical computer system 20.

In some embodiments, each physical computer system 12, 20 includes one or more processors, one or more types of memory, a display and/or other user interface components such as a keyboard, a touch screen display, a mouse, a track-pad, a digital camera and/or any number of supplemental devices to add functionality.

Physical computer system 12, 20 may be coupled to query server 100 through one or more data connections 101, such as a known network, physical cabling, or the like. Similarly, physical computer system 20 may be coupled to query server 100 through one or more data connections 102, such as a known network, physical cabling, or the like.

Query server 100 may include buffer(s) 123, storage devices 128, management module 121, and/or CPU(s) 122. Query server 100 may be a computing entity (e.g. a physical computer, VM, or the like). Storage server 200 may include buffer(s) 223, storage devices 228, management module 221, and/or CPU(s) 222. Storage server 200 may be a computing entity (e.g. a physical computer, VM, or the like).

In some embodiments, storage device 128, 228 is a single storage device while in other embodiments storage devices 128, 228 includes a plurality of storage devices. In some embodiments, storage devices 128, 228 may also include different types of storages devices. In some embodiments, storage devices 128, 228 includes one or more NAND-type flash storage devices, one or more NOR-type flash storage devices. However, other types of storage devices may be included in accordance with aspects of a wide variety of embodiments (e.g., PCRAM, ReRAM, STT-RAM, etc.). In some embodiments, a flash storage device includes one or more flash memory die, one or more flash memory packages, one or more flash memory channels, one or more solid state disk (SSD)s, one or more SSD arrays, or the like.

Query server 100 may further include management module 121, one or more input/output buffer(s) 123, etc. Similarly, storage server 200 may further include management module 221, one or more input/output buffer(s) 223, etc. Query server 100 and storage server 200 may include various additional features that have not been illustrated for the sake of brevity and so as not to obscure more pertinent features of the example embodiments disclosed herein, and that a different arrangement of features may be possible.

Input and output buffer(s) 123 provide an interface to physical computer system 12, 20 through data connections 101, 102, respectively. Management module 121 may include one or more processing units (CPUs, also sometimes called processors) 122 configured to execute instructions in one or more programs or applications (e.g., stored in management module 121). In some embodiments, one or more CPUs 122 are shared by one or more components within, and in some cases, beyond the function of query server 100. Management module 121 is coupled to input/output buffer(s) 123 and storage devices 128 in order to coordinate the operation of these components.

Input and output buffer(s) 223 provide an interface to query server 100 through data connections 201. Management module 221 may include one or more CPUs 222 configured to execute instructions in one or more programs or applications (e.g., stored in management module 221). In some embodiments, one or more CPUs 222 are shared by one or more components within, and in some cases, beyond the function of storage server 200. Management module 221 is coupled to input/output buffer(s) 223 and storage devices 228 in order to coordinate the operation of these components.

Storage server 200 may be coupled to management module 121 through connections 201. Connections 101, 102, 201 are sometimes called data connections, but typically convey commands in addition to data, and optionally convey metadata, error correction information and/or other information in addition to data values to be stored in storage devices 128, 228 and data values read from storage devices 128, 228. For clarity, storage devices 128 and storage devices 228 are included in different computing entities, e.g., in different physical servers.

A query operation may be initiated when a requesting computing entity sends one or more query requests (e.g., via data connections 102) to query server 100 requesting data associated with the one or more query requests. Query server 100 may obtain the data associated with the one or more query requests by fetching aged data from a dataset that is stored locally within storage devices 128 and/or by fetching live query data from storage server 200. Query server 100 may package or assemble the fetched data into a query result, dataset, or the like, may store the dataset locally within storage devices 128, and/or may provide the query result back to the requesting computing entity.

Figure 2:
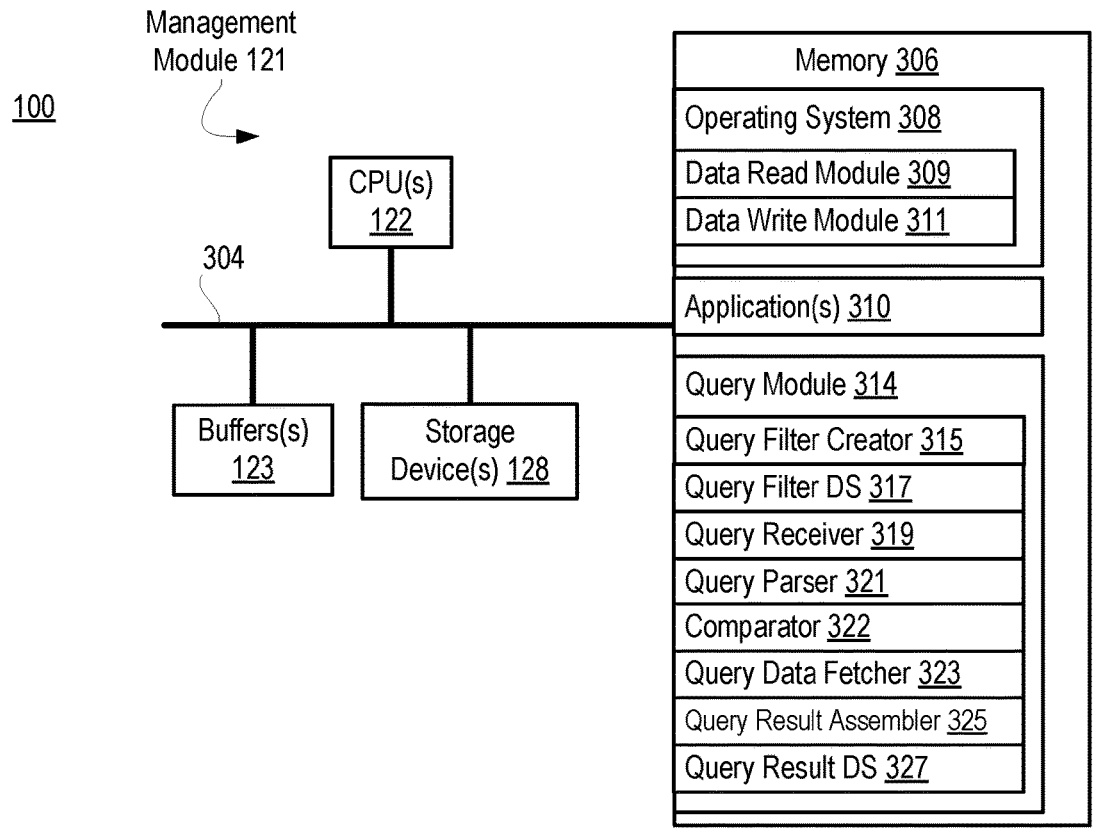
FIG. 2 is a block diagram illustrating an implementation of a data query management module, in accordance with some embodiments.

FIG. 2 is a block diagram illustrating an exemplary management module 121 in accordance with some embodiments. Management module 121 may include: one or more processing units (CPUs) 122 for executing modules, programs, applications, and/or instructions stored in memory 306 and thereby performing processing operations; memory 306; and one or more communication buses 304 for interconnecting these components. One or more communication buses 304, optionally, includes circuitry (sometimes called a chipset) that interconnects and controls communications between components that are connected by bus 304. Management module 121 is coupled to buffer(s) 123 and storage devices 128 by one or more communication buses 304.

Memory 306 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 306, optionally, includes one or more storage devices remotely located from the CPU(s) 122. Memory 306, or alternatively the non-volatile memory device(s) within memory 306, comprises a computer readable storage medium. In some embodiments, memory 306, or the computer readable storage medium of memory 306, stores the following programs, modules, and/or data structures, or a subset or superset thereof:

an operating system 308 that is the operational interface between programs, modules, and/or data structures and hardware resources of the associated computer entity, so that programs, modules, and/or data structures can interact with such hardware resources;

a data read module 309 for reading data from storage devices 128 and/or from storage server 300;

a data write module 311 for writing data to storage devices 128, to storage server 300, and/or to the requesting computing entity;

one or more applications 310; and a query module for receiving and managing a query request and providing a query result to the query request, the query module may include:
  a) a query filter creator 315 to create and store a query filter data structure 317;
  b) a query receiver 319 to receive a query from a query user computing entity;
  c) a query parser 321 to determine a subject associated with the received query;
  d) a comparator 322 to compare a data age query threshold that is associated with the received query with a subject data age period that is associated with the determined subject;
  e) a query data fetcher 323 to obtain aged data from storage devices 128 or live query data from storage server 300 based upon comparator 322; and
  f) a query result assembler 325 to assemble the fetched data into a dataset and/or into a query result data structure 327.

Each of the above identified elements may be stored in one or more of the previously mentioned storage devices 128, 228, memory 306, or the like, respectively and may correspond to a data structure or to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 306 may store a subset of the modules and data structures identified above. Furthermore, memory 306 may store additional modules and data structures not described above. In some embodiments, the programs, modules, and data structures stored in memory 306, or the computer readable storage medium of memory 306, provide instructions for implementing any of the methods described below with reference to FIG. 5A and FIG. 6. In some embodiments, some or all of these modules may be implemented with specialized hardware circuits that subsume part or all of the module functionality.

Although FIG. 2 shows a management module 121, FIG. 2 is intended more as functional description of the various features which may be present in a management module than as a structural schematic of the embodiments described herein. In practice, and as recognized by those of ordinary skill in the art, the programs, modules, and data structures shown separately could be combined and some programs, modules, and data structures could be separated.

Figure 3:
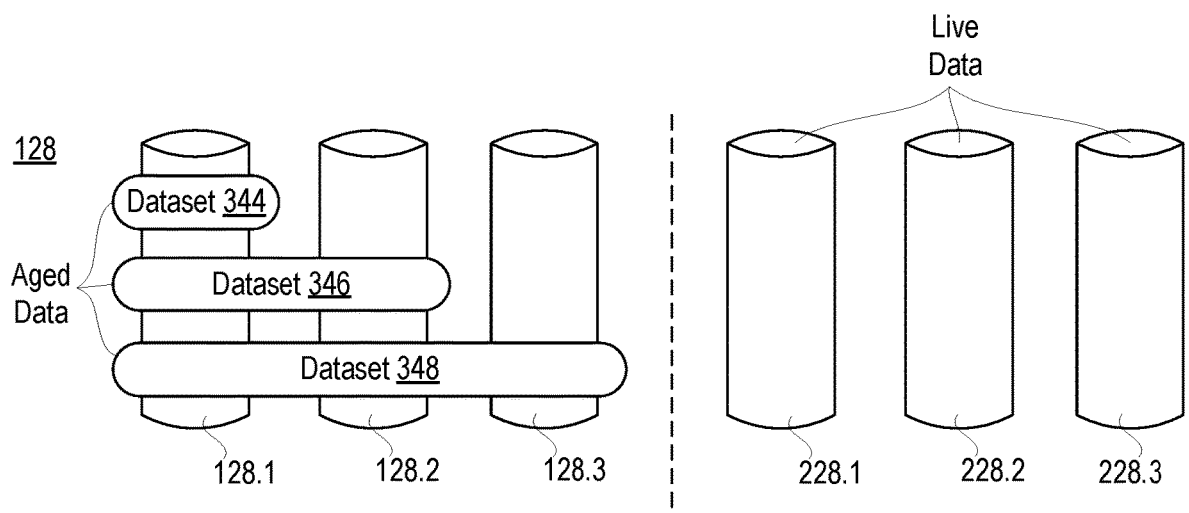
FIG. 3 is a block diagram illustrating an implementation of storage devices within a query server and storage devices within a storage server, in accordance with some embodiments.

FIG. 3 is a block diagram illustrating an implementation of storage devices 128 within query server 100 and storage devices 228 within storage server 200, in accordance with some embodiments. In the various embodiments, generally, storage devices 128, depicted as respective storage devices 128.1, 128.2, and 128.3 may store aged data. The term "aged query data" is defined herein to be data obtained from a query of storage server 200 that is contained within a dataset that has a dataset creation time stamp and an estimated dataset end of useful time period indication. There may be different time classes of aged data stored within storage devices 128. For example, there may be week old data, month old data, quarter old data, year old data, or the like, stored in storage devices 128.

The aged query data may be arranged within a dataset stored within query server 100. Generally, a dataset is a query result obtained by query server 100 performing a query that has not been requested by any query user computing entity but has been anticipatedly prefetched by query server 100 so that such associated data is be stored locally within query server 100. In this manner, data within the dataset may be subsequently fetched by query data fetcher 323, packaged by query result assembler 325, and provided to the requesting computing entity, without the query server 100 obtaining such data from storage server 200. As depicted in FIG. 3, individual or distinct storage devices 128.1, 128.2, and 128.3 may individually or collectively store dataset 344, dataset 346, and/or dataset 348.

Once a dataset is created, the data associated therewith is generally static. As such, datasets may be referred to as a snapshot of the associated aged data. Further, upon creation, each dataset has an associated age. In some instances, a dataset may become stale, or in other words, the age of the dataset exceeds a predetermined dataset refresh time granularity. In such instances, query server 100 may refresh this dataset by performing the same query used to create the associated stale dataset, upon the lapse of the predetermined dataset refresh time granularity and obtain a refreshed query result. Such refreshed query result may also be a dataset, in that it is obtained by query server 100 without being requested by any query user computing entity and by being anticipatedly prefetched by and stored locally within query server 100.

In the various embodiments, storage devices 228, depicted as storage device 228.1, 228.2, and 228.3 store live query data. The term "live query data" is defined herein to be most recent or up to date data in which at least a portion thereof is not included in any preexisting datasets within the query server 100.

Figure 4:
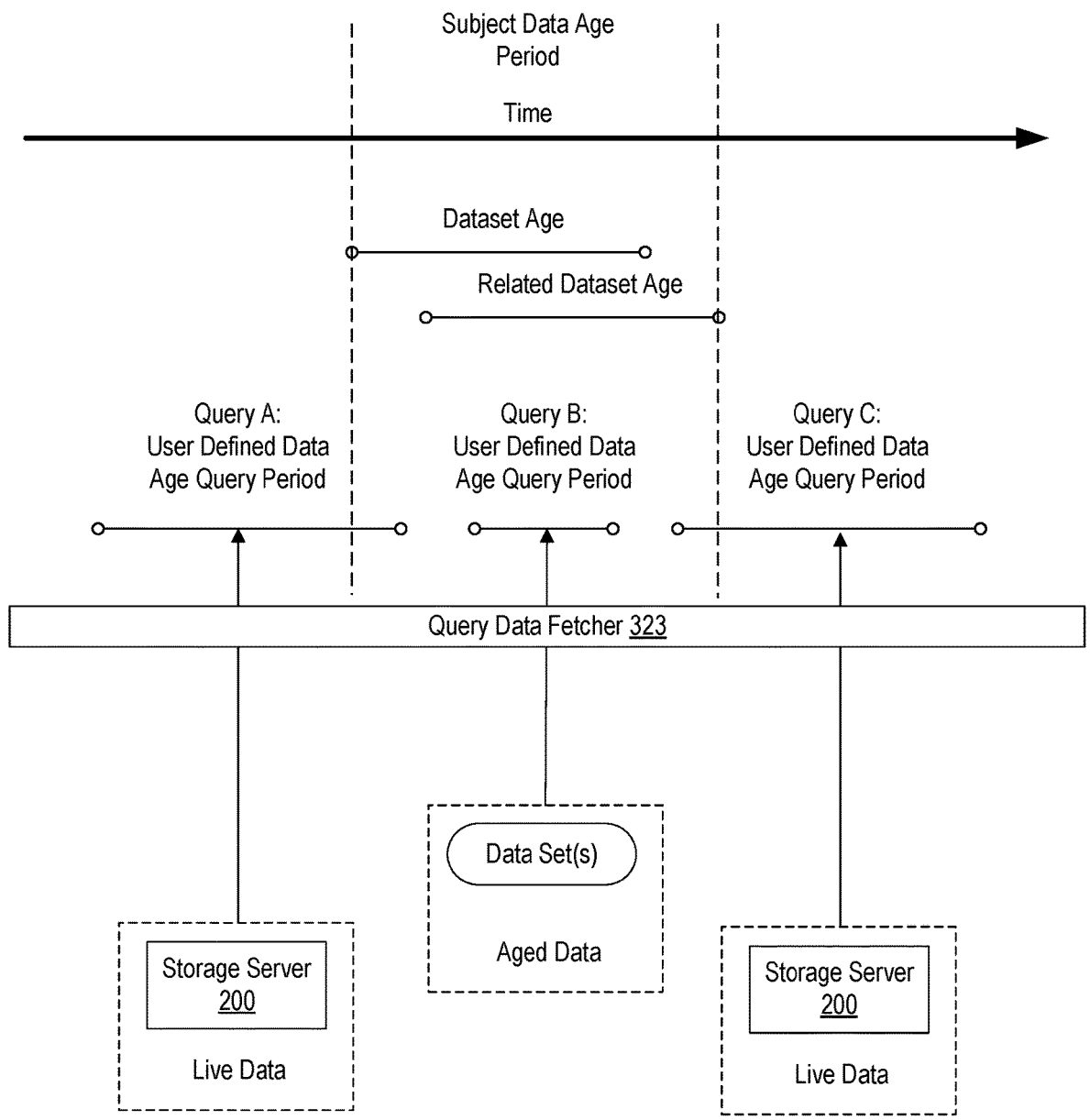
FIG. 4 illustrates a scheme of obtaining live query data from a storage server or aged data within an associated dataset, in accordance with some embodiments.

FIG. 4 illustrates a scheme of obtaining live query data from storage server 200 or aged data within previously created dataset(s), in accordance with some embodiments.

In the various embodiments, a dataset or a group of related datasets have a predefined subject data age period specified and stored within query filter data structure 317 that is associated with the subject of a dataset or a group of related datasets. The subject data age period may define the anticipated usefulness of the data contained within the dataset or a group of related datasets. The subject data age period may be initially set by the computing manager computing entity and may automatically extend upon the addition of a new related dataset into the group of related datasets. The subject data age period may equal the anticipated data set age if associated with a single dataset. The subject data age period may equal a time period between the creation of the oldest dataset in the group of related datasets and the anticipated usefulness of the youngest dataset of the group of related datasets.

Query A may be received by query receiver 319. Query A may contain a user defined data age parameter associated with the query that specifies an applicable time period associated with the desired query data results. As is exemplary depicted, because the user defined data age parameter of Query A is outside or not otherwise within the subject data age period of any dataset(s), query data fetcher 323 obtains the requisite query (live) data from storage server 200. In other words, data within the dataset(s) is not old enough to satisfy Query A.

Query B may be received by query receiver 319. Query B may contain a user defined data age parameter associated with the query that specifies an applicable time period associated with the desired query data results. As is exemplarily depicted, because the user defined data age parameter of Query B is within the subject data age period of at least one dataset, query data fetcher 323 obtains the requisite query (aged) data from the dataset or from the group of related datasets. In other words, data within the dataset(s) is both adequately old enough and young enough (i.e. is not too aged or stale) to satisfy Query B.

In the various embodiments, generally, it is assumed that the dataset(s) contain all adequate data to assemble and return the query result to the requesting query user computing entity. As is known in the art, if the dataset(s) do not contain all adequate data to assemble and return the query result to the requesting query user computing entity, query data fetcher 323 obtains the adequate data from storage server 200.

Query C may be received by query receiver 319. Query C may contain a user defined data age parameter associated with the query that specifies an applicable time period associated with the desired query data results. As is exemplary depicted, because the user defined data age parameter of Query C is outside or not otherwise within the subject data age period of any dataset(s), query data fetcher 323 obtains the requisite query (live) data from storage server 200. In other words, data within the dataset(s) is too aged or stale to satisfy Query C.

Figure 5A:
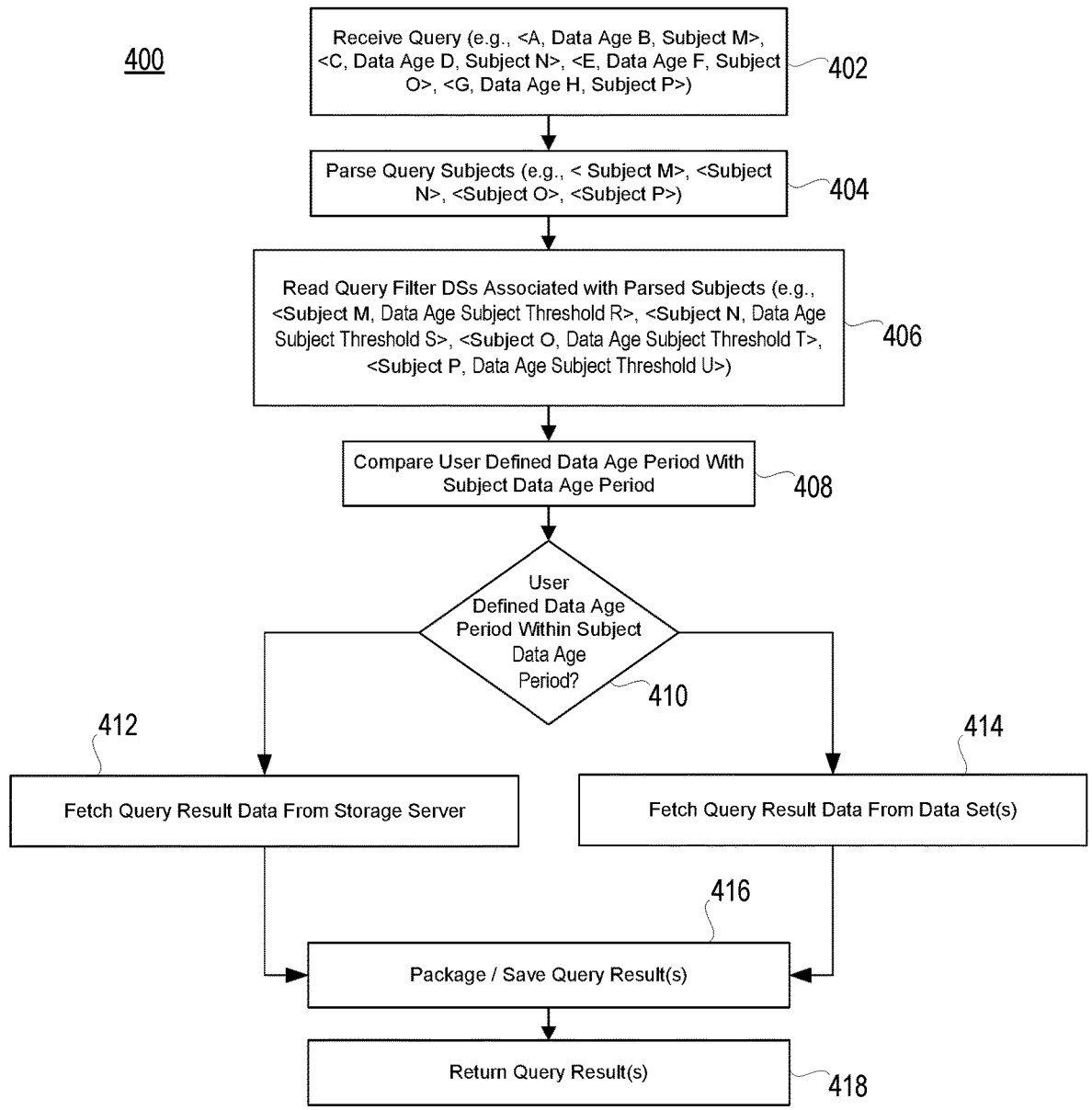
FIG. 5A and FIG. 5B illustrate a scheme of utilizing a query filter data structure to determine whether to obtain live query data from a storage server or aged data within a previously created dataset, in accordance with some embodiments.
Figure 5B:
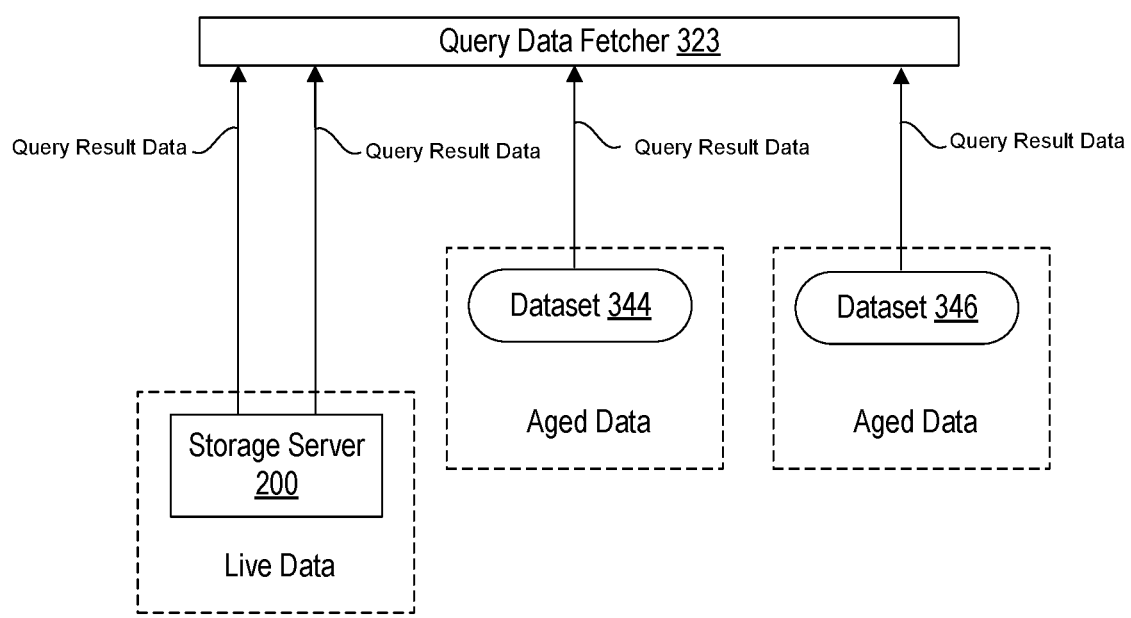

FIG. 5A and FIG. 5B illustrate a scheme of utilizing query filter data structure 317 to determine whether to obtain live query data from storage server 200 or aged data within a previously created dataset, in accordance with some embodiments.

Specifically, FIG. 5A illustrates a method 400 of fetching live query data from storage server 200 or aged data within a previously created dataset in response to a query and by utilizing query filter data structure 317. Method 400 begins by query receiver 319 receiving one or more data queries from the requesting query user computing entity (block 402). For example, as depicted, query server 100 may receive four data queries from one or more requesting query user computing entities. A first data query may specify a user defined data age parameter "A," a user defined data age parameter "B," and an associated query subject "M." A second data query may specify a user defined data age parameter "C," a user defined data age parameter "D," and an associated query subject "N." A third data query may specify a user defined data age parameter "E," a user defined data age parameter "F," and an associated query subject "O." Finally, a fourth data query may specify a user defined data age parameter "G," a user defined data age parameter "H," and an associated query subject "P."

The term "user defined data parameter" is defined herein to be a generic or otherwise known customizable parameter the query user computing entity specifies when initializing a data query. The term "user defined data age parameter" is defined herein to be any type of customizable parameter that the query user computing entity may specify that indicates a desired age period, range, or the like, of query data within the query result data structure 327. For example, a query may request customer sales for the most recent quarter. The user defined data age parameter for such query would be the time period associated with the "most recent complete quarter."

The term "subject" is defined herein to be a definition of an intersection of various data sources used to fetch and package data of an associated query result. For example, a "customer sales" subject may define a query if the associated query result is obtained from a "customer list" data source and a "sales" data source.

The user defined data age parameter and subject of the data query may be specified by the user computing entity and contained within the query request, may be determined by the query server 100 from the received query request, or the like.

In an example continued below, query receiver 319 may receive a query of <customer sales, most recent complete quarter>.

Method 400 may continue with query parser 321 parsing or otherwise determining each subject of the received queries (block 404). For example, query server 100 determines or parses subject "M" as the subject of the first query, subject "N" as the subject of the second query, subject "0" as the subject of the third query, and subject "P" as the subject of the fourth query.

In the example, query parser 321 may parse and determine the subject of the exemplary query as <customer sales>.

Method 400 may continue with query module 314 reading each query filter data structure 317 that is associated with the parsed subjects (block 406). For example, query server 100 reads a first query filter data structure 317.1 (not shown) previously created by query manager computing entity and stored within query server 100 that specifies and associates subject data age period "R" with subject "M." Similarly, query server 100 reads a second query filter data structure 317.2 (not shown) previously created by query manager computing entity and stored within query server 100 that specifies and associates subject data age period "S" with subject "N." Likewise, query server 100 reads a third query filter data structure 317.3 (not shown) previously created by query manager computing entity and stored within query server 100 that specifies and associates subject data age period "T" with subject "O." Likewise, query server 100 reads a fourth query filter data structure 317.4 (not shown) previously created by query manager computing entity and stored within query server 100 that specifies and associates subject data age period "U" with subject "P."

In an embodiment, a single query filter data structure 317 may be associated with each data set, the whole of related datasets, or the like.

In the example, query module 314 may read the query filter data structure 317 that is associated with the subject <customer sales>.

Method 400 may continue with comparator 322 comparing the applicable user defined data age parameter with the applicable subject data age period and determining whether the compared user defined data age parameter is entirely within the subject data age period (block 408, 410).

For example, comparator 322 compares user defined data age parameter "B" with subject data age period "R," compares user defined data age parameter "D" with subject data age period "S," compares user defined data age parameter "F" with subject data age period "T," and compares user defined data age parameter "H" with subject data age period "U."

In the example, comparator 322 may compare the applicable user defined data age parameter (i.e., time period associated with the most recent complete quarter) with the applicable subject data age period (e.g., time period between the associated data set creation date and the predefined usefulness age of one week) within the read query filter data structure 317 that is associated with the subject <customer sales> of an existing dataset or series of related datasets.

Method 400 may continue with query data fetcher 323 fetching query data from storage server 200 if the applicable user defined data age parameter is not entirely within or bounded by the subject data age period (block 412). This would exemplary occur if data within the preexisting dataset(s) is either too old or not old enough to satisfy the associated query. Because the data in such dataset(s) would be too young or too aged, respectively, query module 314 effectively determines that query data should be fetched from the storage server 200.

Method 400 may continue with query data fetcher 323 fetching query data from the applicable dataset, most recent dataset of the series of related datasets, some or all of the related datasets, etc., if the applicable user defined data age parameter is entirely within or bounded within applicable subject data age period (block 414). Because the data in such exemplary dataset(s) is neither too young nor too aged, query module 314 effectively determines that query data should be fetched from the applicable dataset(s).

As is exemplarily depicted in FIG. 4B, query data fetcher 323 may fetch query data from storage server 200 to satisfy the first query because the applicable user defined data age parameter "B" associated with <subject M> is not entirely within or bounded by subject data age period "R." Similarly, query data fetcher 323 may fetch query data from storage server 200 to satisfy the second query because the applicable user defined data age parameter "D" associated with <subject N> is not entirely within or bounded by subject data age period "S." Similarly, query data fetcher 323 may fetch query data from the associated dataset 344 to satisfy the third query because the applicable user defined data age parameter "F" associated with <subject O> is entirely within and bounded by subject data age period "T." Likewise, query data fetcher 323 may fetch query data from the associated dataset 346 to satisfy the fourth query because the applicable user defined data age parameter "H" associated with <subject P> is entirely within and bounded by subject data age period "U."

Method 400 may continue with query result assembler 325 assembling or packaging the fetched data into a query result and/or into a query result data structure 327 (block 416). The query result data structure 327 may take the form of a query result packaged to send to the query user requesting computing entity or may be packaged into a dataset. For example, query result assembler 325 may assemble and package query result data structure 327.1 (not shown) for the first query, may assemble and package query result data structure 327.2 (not shown) for the second query, may assemble and package query result data structure 327.3

(not shown) for the third query, and may assemble and package query result data structure 327.4 (not shown) for the fourth query.

Finally, method 400 may continue with query module 314 providing the query result data structure 327 to the requesting query user computing entity (block 418). For example, query module 314 may send the query result data structures 327.1, 327.2, 327.3, and 327.4 to the appropriate requesting query user computing entity or entities. Alternatively, or in addition thereto, method 400 may continue with query module 314 saving the query result data structure 327 as a dataset locally within storage device(s) 128 within query server 100.

Figure 6:
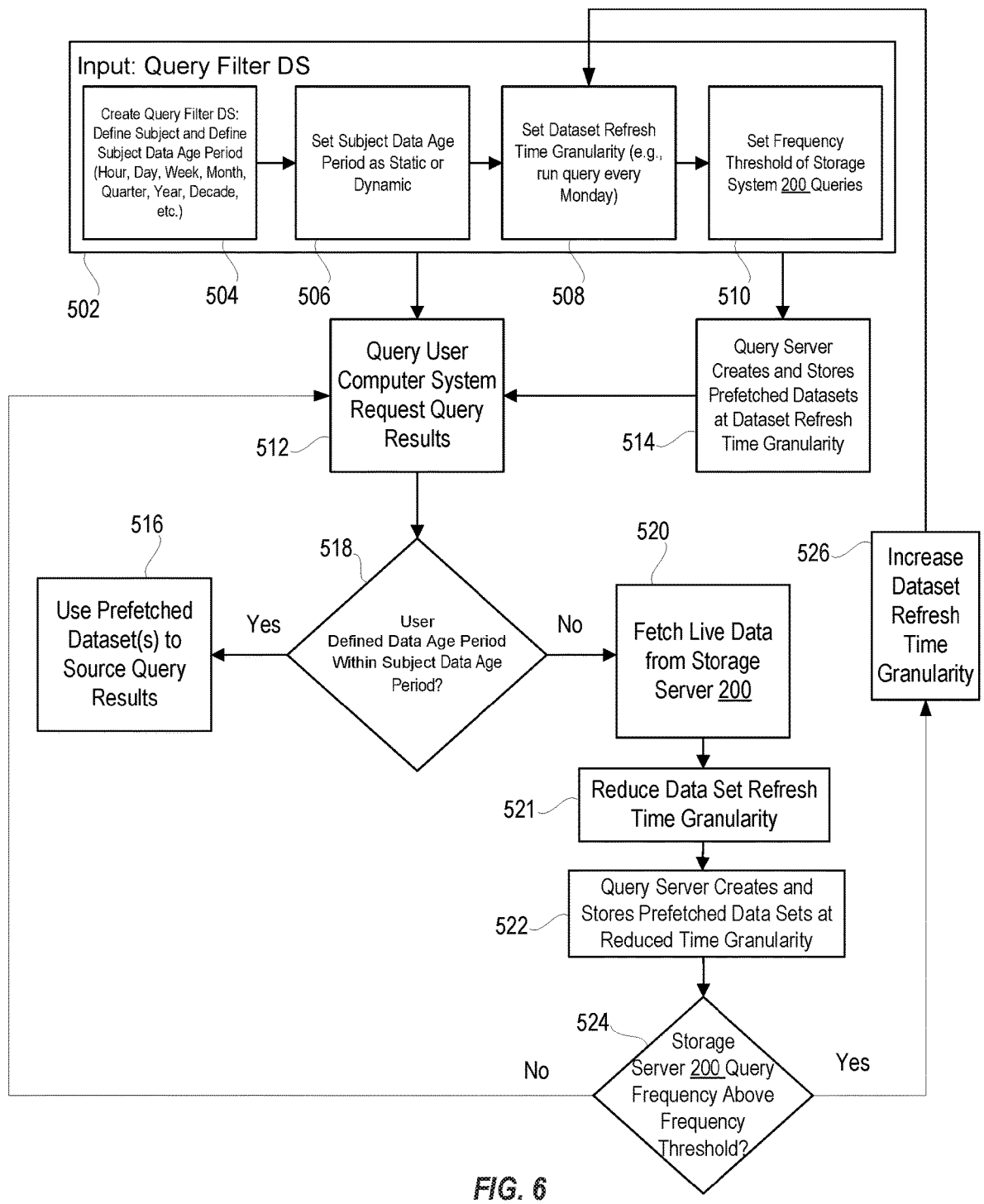
FIG. 6 illustrates a method of adjusting a dataset refresh time granularity based upon a data age indication contained a subsequent user query request and/or based upon a frequency of storage server queries, in accordance with some embodiments.

FIG. 6 illustrates a method 500 of adjusting a frequency of a previously set dataset refresh granularity based upon a user defined data age parameter, specified within a subsequent user query request, and/or based upon a frequency of storage server 200 queries, in accordance with some embodiments.

Method 500 may begin with query manager computing entity creating a query filter data structure 317 that is associated with an existing dataset or will be associated with a dataset, or a series of related datasets (block 502). For example, query manager computing entity may create, via a web browser, or the like, the query filter data structure 317 which is received by query server 100.

The query filter data structure 317 may specify or otherwise include a subject that defines or will define the query results either in the form of results provided to the query user requesting computing entity or in the form of a dataset. The query filter data structure 317 may further include a subject data age period associated with the query (block 504). The subject data age period may specify a data age usefulness span, as initially estimated by the query manager computing entity, of data that is or will be associated with the query result. For example, subject data age period may indicate that the expected life span of the data may be one hour, one day, one week, one month, one quarter, one year, one decade, or the like from the creation query result.

The query manager computing entity may further specify within the query filter data structure 317 whether the subject data age period may be modifiable. If it cannot be modified, the query manager computing entity may indicate the subject data age period is static and if the subject data age period is modifiable the query manager computing entity may indicate the subject data age period is dynamic (block 506).

The query manager computing entity may further set an initial dataset refresh time granularity (block 508). For example, the query manager computing entity may indicate that an associated dataset should be refreshed every week. As such a set or series of related datasets are to be created using the same query and prefetched into query server 100 at the indicated dataset refresh time granularity.

The query manager computing entity may further set an initial storage server 200 frequency threshold (block 510). For example, the query manager computing entity may indicate an overall maximum frequency that the query data fetcher 323 may fetch query data from storage server 200, may indicate a maximum frequency that the query data fetcher 323 may fetch query data from storage server 200 associated per each dataset, series of related datasets, or the like.

Method 500 may continue with query server 100 creating and storing the dataset and/or the series of related datasets each separated in time by the dataset refresh time granularity (block 514). Further, method 500 may continue with the query user computing entity sending a query request to the query server 100 (block 512).

Method 500 may continue with comparator 322 comparing the applicable user defined data age parameter with the applicable subject data age period and determining whether the compared user defined data age parameter is entirely within the subject data age period (block 518).

Method 500 may continue with query data fetcher 323 fetching query data from the applicable dataset(s) if the applicable user defined data age parameter is entirely within or bounded within applicable subject data age period (block 516). Because the data in such exemplary dataset(s) is neither too young nor too aged, query module 314 effectively determines that query data could be fetched from the applicable dataset(s) without obtaining such data from the storage server 200.

Method 500 may continue with query data fetcher 323 fetching query data from storage server 200 if the applicable user defined data age parameter is not entirely within or bounded by the subject data age period (block 520). This would exemplary occur if data within the preexisting dataset(s) associated with the subject of the user query is either too old or not old enough to satisfy the query. Because the data in such dataset(s) would be too young or too aged, respectively, query module 314 effectively determines that the associated dataset(s) dot not contain the request data, and that query data fetcher 323 should fetch such data from the storage server 200.

Method 500 may continue with query module 314 reducing the dataset refresh time granularity associated with the preexisting dataset(s) associated with the subject of the user query (block 521). The quantity or time period that such dataset refresh time granularity is reduced may be predefined. For example, if the initial refresh time granularity associated with the preexisting dataset(s) associated with the subject of the user query was set for one week, query module 314 may reduce the refresh time granularity to one day, or the like.

Method 500 may continue with query server 100 creating and storing subsequent related datasets, now separated in time by the reduced dataset refresh time granularity (block 522).

Method 500 may continue with the query module 314 determining whether the query data fetcher 323 is fetching query data from storage server 200 above the frequency threshold of storage system 200 queries (block 524). Method 500 may continue with increasing the dataset refresh time granularity associated with one or more preexisting dataset(s) (e.g., the dataset(s) associated with the subject of the user query), if the query data fetcher 323 is fetching query data from storage server 200 above the frequency threshold of storage system 200 queries (block 526). The quantity or time period that such dataset refresh time granularity is increased may be predefined. For example, if the current refresh time granularity associated with the preexisting dataset(s) is one day, query module 314 may increase the refresh time granularity to one week, or the like. Subsequently, method 500 may return to block 502.

Method 500 may return to block 512, if the query data fetcher 323 is not fetching query data from storage server 200 above the frequency threshold of storage system 200 queries.

The embodiments may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over those found in the marketplace, or to enable others of ordinary skill in the art to understand the embodiments disclosed herein.

What is claimed is:

1. A query system comprising:
a query server comprising a processor and a memory, the memory comprising a query module, that when called by the processor, causes the query server to:
receive, from a query manager computing entity, a plurality of query filter data structures each comprising a different assigned query subject and a subject data age period;
receive, from a query user computing entity, a query comprising a request for a query result and a user defined data age parameter;
parse the query to determine a query subject;
identify one query filter data structure of the plurality of query filter data structures comprising a same assigned query subject to the query subject;
determine whether the user defined data age parameter is entirely bounded within the subject data age period of the one query filter data structure, wherein the user defined data age parameter is entirely bounded within the subject data age period of the one query filter data structure if the user defined data age parameter occurs between a creation time of the one query filter data structure and an expected life span of the one query filter data structure;
fetch query result data from a dataset that is stored within the query server and is associated with the one query filter data structure, if the user defined data age parameter is entirely bounded within the subject data age period of the one query filter data structure; and
fetch query result data from a storage server, a different physical server relative to the query server, that is communicatively connected to the query server by a network, if the user defined data age parameter is not entirely bounded within the subject data age period of the one query filter data structure.

2. The query system of claim 1, wherein the query result data fetched from the dataset is aged data.

3. The query system of claim 1, wherein the query result data fetched from the storage server is live data.

4. The query system of claim 1, wherein the query result data is fetched from the data set and one or more other related datasets each associated with the one query filter data structure, if the user defined data age parameter is entirely bounded within the subject data age period of the one query filter data structure.

5. The query system of claim 1, wherein each of the plurality of query filter data structures comprise a dataset refresh time granularity.

6. The query system of claim 5, wherein the query module, when called by the processor, further causes the query server to:
reduce the dataset refresh time granularity of the one query filter data structure if query result data is fetched from the storage server.

7. The query system of claim 6, wherein the query module, when called by the processor, further causes the query server to:
create a related dataset that is related to the dataset associated with the one query filter data structure at the reduced dataset refresh time granularity.

8. The query system of claim 7, wherein the query module, when called by the processor, further causes the query server to:
determine whether query result data is fetched from the storage server at a frequency greater than a predetermined frequency threshold.

9. The query system of claim 8, wherein the query module, when called by the processor, further causes the query server to:
increase the dataset refresh time granularity of the one query filter data structure, if query result data is fetched from the storage server at the frequency greater than the predetermined frequency threshold.

10. A computer program product to fetch query result data, the computer program product comprising a computer readable storage medium having program instructions embodied therewith, wherein the program instructions are readable to cause a processor to:
receive, from a query manager computing entity, a plurality of query filter data structures each comprising a different assigned query subject and a subject data age period;
receive, from a query user computing entity, a query comprising a request for a query result and a user defined data age parameter;
parse the query to determine a query subject;
identify one query filter data structure of the plurality of query filter data structures comprising a same assigned query subject to the query subject;
determine whether the user defined data age parameter is entirely bounded within the subject data age period of the one query filter data structure, wherein the user defined data age parameter is entirely bounded within the subject data age period of the one query filter data structure if the user defined data age parameter occurs between a creation time of the one query filter data structure and an expected life span of the one query filter data structure;
fetch query result data from a dataset that is stored within the query server and is associated with the one query filter data structure, if the user defined data age parameter is entirely bounded within the subject data age period of the one query filter data structure; and
fetch query result data from a storage server, a different physical server relative to the query server, that is communicatively connected to the query server by a network, if the user defined data age parameter is not entirely bounded within the subject data age period of the one query filter data structure.

11. The computer program product of claim 10, wherein the query result data fetched from the dataset is aged data.

12. The computer program product of claim 10, wherein the query result data fetched from the storage server is live data.

13. The computer program product of claim 10, wherein the query result data is fetched from the data set and one or more other related datasets each associated with the one query filter data structure, if the user defined data age parameter is entirely bounded within the subject data age period of the one query filter data structure.

14. The computer program product of claim 10, wherein each of the plurality of query filter data structures comprise a dataset refresh time granularity.

15. The computer program product of claim 14, wherein the query module, when called by the processor, further causes the query server to:
reduce the dataset refresh time granularity of the one query filter data structure if query result data is fetched from the storage server.

16. The computer program product of claim 15, wherein the query module, when called by the processor, further causes the query server to:

create a related dataset that is related to the dataset associated with the one query filter data structure at the reduced dataset refresh time granularity.

17. The computer program product of claim 16, wherein the query module, when called by the processor, further causes the query server to:
determine whether query result data is fetched from the storage server at a frequency greater than a predetermined frequency threshold.

18. The computer program product of claim 17, wherein the query module, when called by the processor, further causes the query server to:
increase the dataset refresh time granularity of the one query filter data structure, if query result data is fetched from the storage server at the frequency greater than the predetermined frequency threshold.

19. A method to fetch query result data comprising:
receiving, from a query manager computing entity, a plurality of query filter data structures each comprising a different assigned query subject and a subject data age period;
receiving, from a query user computing entity, a query comprising a request for a query result and a user defined data age parameter;
parsing the query to determine a query subject;
identifying one query filter data structure of the plurality of query filter data structures comprising a same assigned query subject to the query subject;
determining whether the user defined data age parameter is entirely bounded within the subject data age period of the one query filter data structure, wherein the user defined data age parameter is entirely bounded within the subject data age period of the one query filter data structure if the user defined data age parameter occurs between a creation time of the one query filter data structure and an expected life span of the one query filter data structure;
fetching query result data from a dataset that is stored within the query server and is associated with the one query filter data structure, if the user defined data age parameter is entirely bounded within the subject data age period of the one query filter data structure; and
fetching query result data from a storage server, a different physical server relative to the query server, that is communicatively connected to the query server by a network, if the user defined data age parameter is not entirely bounded within the subject data age period of the one query filter data structure.

20. The method to fetch query result data of claim 19, wherein query result data is fetched from the data set and one or more other related datasets each associated with the one query filter data structure, if the user defined data age parameter is entirely bounded within the subject data age period of the one query filter data structure.

* * * * *